(12) United States Patent
Wiggins et al.

(10) Patent No.: US 7,472,013 B1
(45) Date of Patent: Dec. 30, 2008

(54) SYSTEM AND METHOD FOR ESTIMATING VOLUMETRIC EFFICIENCY FOR ENGINES WITH INTAKE AND EXHAUST CAM PHASERS

(75) Inventors: Layne K. Wiggins, Plymouth, MI (US); Kenneth P. Dudek, Rochester Hills, MI (US); Jason Meyer, Dayton, OH (US); Yann G. Guezennec, Upper Arlington, OH (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/965,130

(22) Filed: Dec. 27, 2007

Related U.S. Application Data (60) Provisional application No. 60/961,546, filed on Jul. 20, 2007.

(51) Int. Cl.
*G06F 19/00* (2006.01)

(52) U.S. Cl. .................... 701/102; 701/110; 123/90.15; 123/90.17

(58) Field of Classification Search ................. 701/102, 701/101, 110, 115; 123/90.15, 90.17
See application file for complete search history.

(56) References Cited

U.S. PATENT DOCUMENTS

| | | | |
|---|---|---|---|
| 6,600,989 B2 * | 7/2003 | Sellnau et al. | 701/110 |
| 6,997,149 B1 * | 2/2006 | Ruiz | 123/90.15 |
| 2007/0221149 A1 * | 9/2007 | Ruiz | 123/90.17 |

* cited by examiner

*Primary Examiner*—Hieu T Vo (57) ABSTRACT

An engine control module comprises a table that outputs a parked VE estimate based on an input parameter when intake and exhaust cam phasers of an engine are in a parked position. A calculation module calculates VE estimate when the intake and exhaust cam phasers are not in a parked position based on the parked VE estimate and a mathematical relationship.

20 Claims, 10 Drawing Sheets

SYSTEM AND METHOD FOR ESTIMATING VOLUMETRIC EFFICIENCY FOR ENGINES WITH INTAKE AND EXHAUST CAM PHASERS

CROSS-REFERENCE TO RELATED APPLICATIONS

This application claims the benefit of U.S. Provisional Application No. 60/961,546, filed on Jul. 20, 2007. The disclosure of the above application is incorporated herein by reference in its entirety.

FIELD

The present disclosure relates to engine control systems, and more particularly to engine control systems for engines with intake and exhaust cam phasers.

BACKGROUND

The statements in this section merely provide background information related to the present disclosure and may not constitute prior art.

In a four-stroke naturally aspirated engine, the theoretical maximum amount of air that each cylinder can ingest during the intake cycle is equal to the swept volume of the cylinder. Since each cylinder has one intake stroke every two revolutions of the crankshaft, the theoretical maximum volume of air ingested during each rotation of the crankshaft is equal to one-half the displacement. The actual amount of air that the engine ingests compared to the theoretical maximum is called volumetric efficiency (VE).

There are many factors that determine the amount of torque an engine can produce and the RPM at which the maximum torque occurs. One determinant is the mass of air the engine can ingest into the cylinders. There is a strong relationship between VE and maximum torque. Generally, the RPM at peak VE coincides with the RPM at the torque peak.

VE has been calculated using lookup tables for engines without intake and exhaust cam phasers. Lookup tables can be cumbersome when intake and exhaust cam phasers are added. Mathematical relationships can be used to handle the complexity of VE with intake and exhaust cam phasers. However, mathematical relationships tend to increase calibration effort and time. Accuracy may also be reduced.

SUMMARY

An engine control module comprises a table that generates a parked VE estimate based on engine speed and load when intake and exhaust cam phasers of an engine are in a parked position. A calculation module calculates a VE estimate using a mathematical relationship based on the parked VE estimate and the engine speed and load when the intake and exhaust cam phasers are not in a parked position.

In other features, an addition module may generate an addition term based on a first mathematical relationship. The first mathematical relationship may be based on manifold absolute pressure (MAP), engine speed (RPM), an intake cam phaser (ICAM) position and an exhaust cam phaser (ECAM) position. The first mathematical relationship may be:

$$f_{add}(ICAM, ECAM, MAP, RPM) = b_1 ICAM + b_2 ECAM + b_3 ICAM*ECAM + b_4 ICAM^2 + b_5 ECAM^2 + b_6 ICAM*MAP + b_7 ECAM*MAP + b_8 RPM*ICAM + b_9 RPM*ECAM + b_{10} RPM*MAP*ICAM*ECAM$$

where $b_{1\ldots10}$ are calibration coefficients.

In other features, the calculation module may comprise a multiplication module that generates a multiplication term based on a second mathematical relationship. The second mathematical relationship may be based on manifold absolute pressure (MAP), engine speed (RPM), an intake cam phaser position (ICAM) and an exhaust cam phaser position (ECAM). The second mathematical relationship may be:

$$f_{mult}(ICAM, ECAM, MAP, RPM) = 1 + a_1 ICAM + a_2 ECAM + a_3 ICAM*ECAM + a_4 ICAM^2 + a_5 ECAM^2 + a_6 ICAM*MAP + a_7 ECAM*MAP + a_8 MAP^2*ICAM*ECAM + a_9 RPM*ICAM*ECAM + a_{10} RPM^2*ICAM*ECAM$$

where $a_{1\ldots10}$ are calibration coefficients.

In other features, the calculation module may comprise a VE calculation module that calculates the VE estimate using a third mathematical relationship based on the parked VE estimate, the addition term and the multiplication term. The third mathematical relationship may be:

$$VE = VE_{parked} \times f_{mult} + f_{add}$$

wherein the addition term is $f_{add}$ and the multiplication term is $f_{mult}$.

In other features, the engine control module may adjust at least one engine parameter based on VE. The engine control module may calculate at least one of cylinder mass air flow, torque and an air/fuel ratio based on the VE estimate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of the embodiments is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The present disclosure uses a table look-up to determine the VE with the cam phasers in the "park" position. A mathematical function is then used to represent the intake and exhaust cam phaser effects. This mathematical function may be based on engine speed, load, intake camshaft position, exhaust camshaft position and/or other sensed or modeled variables. Since the mathematical function only has to represent the effects of the intake and exhaust cam phasers, calibration is easier and more accurate.

Real-time estimation of VE in an engine control module ensures correct cylinder air mass estimation for the engine. Cylinder air mass estimation ensures correct air/fuel ratio control during combustion and may be used to meet emissions and driveability requirements. The engine control module adjusts at least one engine parameter based on the VE estimate. For example only, the engine control module calculates at least one of cylinder mass air flow, torque and an air/fuel ratio based on the VE estimate.

For engines without cam phasers, VE may be represented as a function of engine speed (RPM) and load (usually represented by manifold pressure (MAP), throttle position or other parameter). In these circumstances, the table look-up approach is widely used because effective calibration methods are known. With intake and exhaust cam phasers, VE may be represented as a function of RPM, MAP, and cam position (ICAM for intake cam position and ECAM for exhaust cam). Table lookups can be used under these circumstances, but the high dimensionality of the table tends to be expensive to calibrate and store.

For engines with intake and exhaust cam phasers, mathematical approximations for VE may be used. While these mathematical functions are easier to calibrate and store, the VE table is no longer part of the calibration process. Many calibrators have experience manipulating VE tables to achieve engine control goals. Calibrators generally are not as skilled at manipulating VE functions when they are represented functionally. Moreover, many of the functional approximation methods suffer from accuracy problems or require an excessive number of parameters, which raises calibration and memory storage costs.

The present disclosure describes a hybrid method for representing VE that maintains the advantages of table lookup and mathematical functional representation while mitigating drawbacks of each.

Figure 1:
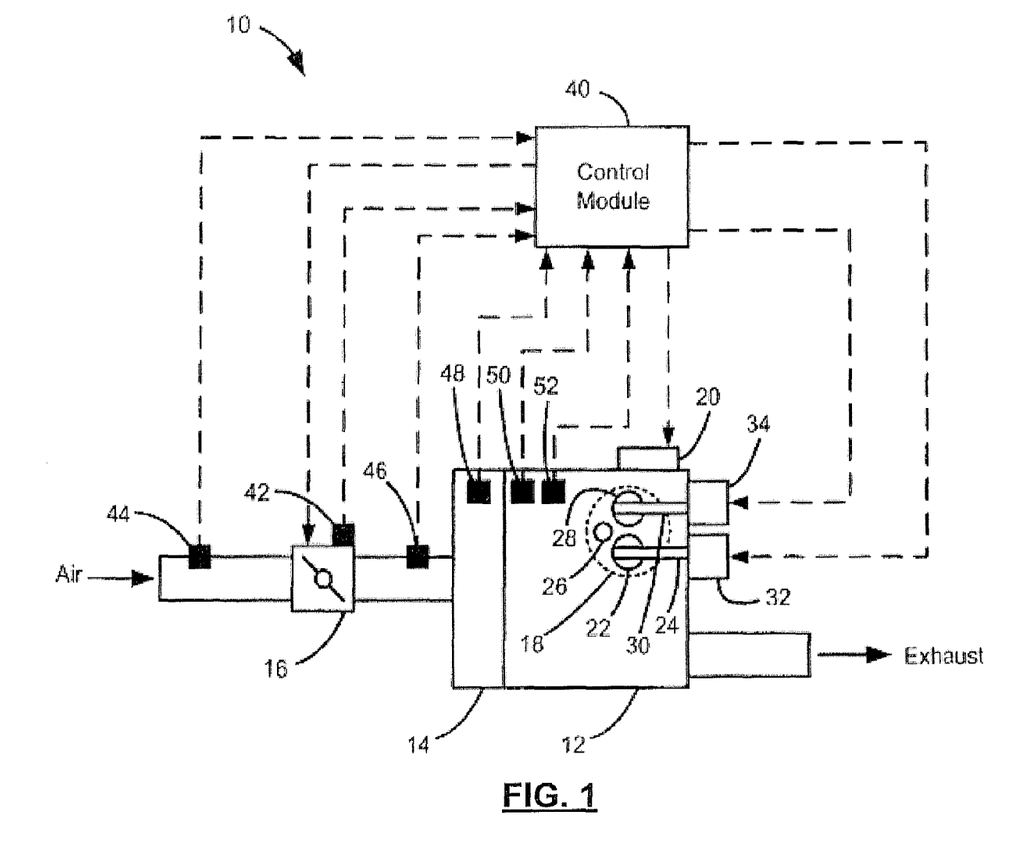
FIG. 1 is a functional block diagram of exemplary engine system according to the present disclosure.

Referring now to FIG. 1, an exemplary engine system 10 with intake and exhaust cam phasers is shown. The engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, the engine system 10 may be implemented in engines having a plurality of cylinders including, but not limited to, 2, 3, 4, 5, 6, 8, 10 and 12 cylinders.

A fuel injector (not shown) injects fuel that combines with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22, 28 are illustrated, it is appreciated that the engine 12 can include multiple intake and exhaust valves 22, 28 per cylinder 18.

The engine system 10 further includes an intake cam phaser 32 and an exhaust cam phaser 34 that respectively regulate the rotational timing and/or lift of the intake and exhaust cam shafts 24, 30. More specifically, the timing of the intake and exhaust cam shafts 24, 30 can be retarded or advanced with respect to each other or with respect to a location of the piston within the cylinder 18 or crankshaft position. In this manner, the position of the intake and exhaust valves 22, 28 can be regulated with respect to each other or with respect to a location of the piston within the cylinder 18. By regulating the position of the intake valve 22 and the exhaust valve 28, the quantity of air/fuel mixture ingested into the cylinder 18 can be regulated. Additionally, the quantity of exhaust vented through the exhaust valve 28 can be regulated.

A control module 40 generates a throttle control signal based on a position of an accelerator pedal (not shown) and a throttle position signal generated by a throttle position sensor (TPS) 42. A throttle actuator adjusts the throttle position based on the throttle control signal. The throttle actuator can include a motor or a stepper motor, which provides limited and/or coarse control of the throttle position. The control module 40 also regulates the fuel injection system 20 and the cam shaft phasers 32, 34, as discussed in further detail below.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed of the engine 102 and generates in an engine speed signal. Each of the signals generated by the sensors is received by the control module 40.

The control module 40 may control the timing and/or energy of the spark plug ignition. The timing may be advanced or retarded relative to the position of piston within the cylinder 18 and relative to the positions of the intake valve 22 and/or the exhaust valve 28. The control module 40 estimates VE to ensure correct cylinder air mass estimation for the engine. Cylinder air mass estimation is used to ensure correct air/fuel (A/F) ratio control, which may be used to meet emissions and driveability requirements. The engine control module adjusts at least one engine parameter based on the VE estimate. For example only, the engine control module calculates at least one of cylinder mass air flow, torque and an air/fuel ratio based on the VE estimate.

The engine system 10 is merely exemplary in nature. For example only, the engine system 10 may include other sensors, forced induction using a turbocharger or supercharger, and/or other variations.

The control module 40 estimates the VE using a combination of a table look-up and mathematical functions. The control module 40 estimates the VE using the following equations set forth below:

$$VE(ICAM,ECAM,MAP,RPM)=VE_{parked}(MAP, RPM) \times f_{mult}(ICAM,ECAM,MAP,RPM)+f_{add}(ICAM,ECAM,MAP,RPM)$$

$$f_{mult}(ICAM,ECAM,MAP,RPM)=1+a_1 ICAM+ a_2 ECAM+a_3 ICAM*ECAM+a_4 ICAM^2+ a_5 ECAM^2+a_6 ICAM*MAP+a_7 ECAM*MAP+ a_8 MAP^2*ICAM*ECAM+ a_9 RPM*ICAM*ECAM+ a_{10} RPM^2*ICAM*ECAM$$

$$f_{add}(ICAM,ECAM,MAP,RPM)=b_1 ICAM+b_2 ECAM+ b_3 ICAM*ECAM+b_4 ICAM^2+b_5 ECAM^2+ b_6 ICAM*MAP+b_7 ECAM*MAP+ b_8 RPM*ICAM+b_9 RPM*ECAM+ b_{10} RPM*MAP*ICAM*ECAM$$

For example only, the table look-up ($VE_{parked}$ above) may be based on engine load (such as MAP) and engine speed (such as RPM). The table represents VE for the engine when the camshaft phasers are in the parked position.

The mathematical function comprises a multiplicative term ($f_{mult}$) and an additive term ($f_{add}$). Both terms may be a function of engine load (MAP), engine speed (RPM), intake cam position (ICAM), exhaust cam position (ECAM) and/or other parameters. Both functions may include calibration parameters ($a_x$ values for the multiplicative term and $b_y$ values for the additive term).

Figure 2:
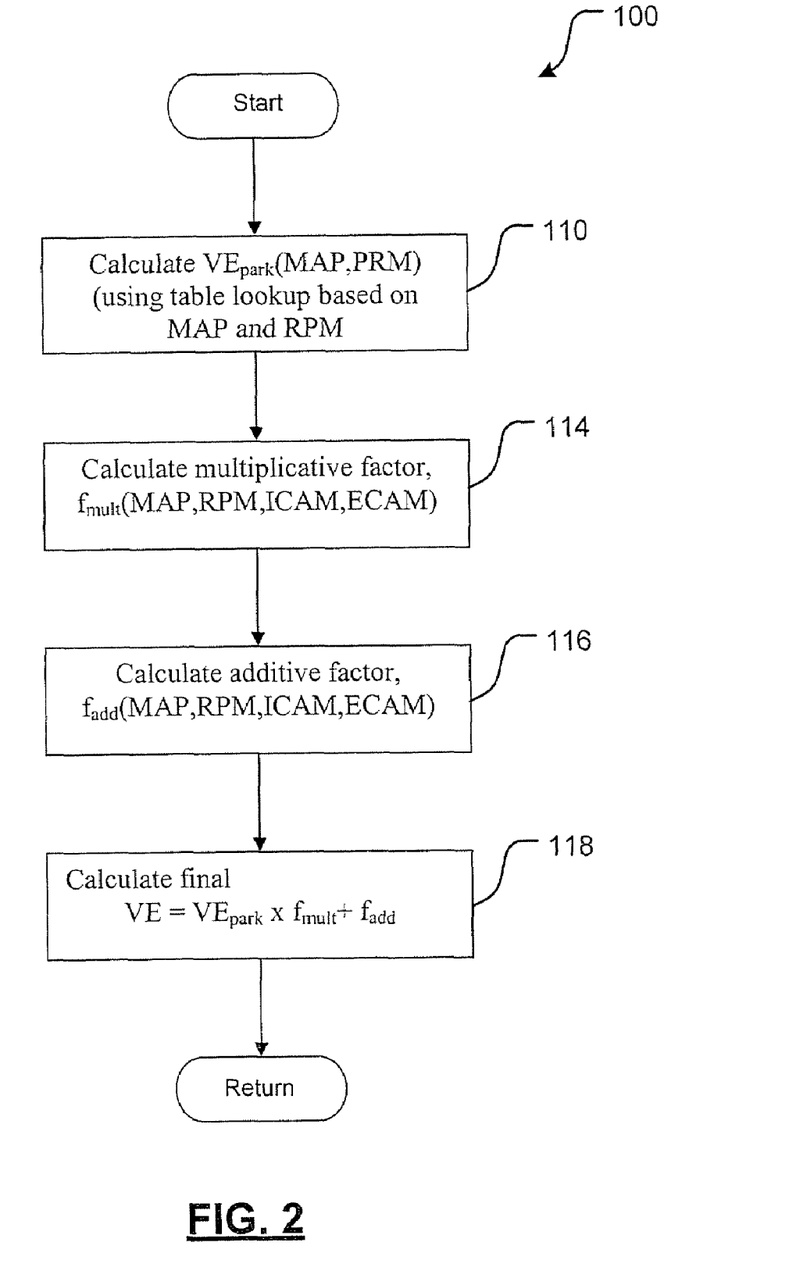
FIG. 2 illustrates a method for calculating VE.

Referring now to FIG. 2, a method 100 is shown for estimating VE. In step 110, $VE_{parked}$ is estimated by accessing a lookup table based on at least one measured or estimated value. For example only, the lookup table may be accessed based on engine load and speed, such as MAP and/or RPM. In step 114, the multiplication factor $f_{mult}$ is calculated. In step 116, the addition factor $f_{add}$ is calculated. In step 118, the final VE value is calculated based on the $VE_{parked}$, $f_{mult}$ and $f_{add}$.

The engine control module adjusts at least one engine parameter based on the VE estimate. For example only, the engine control module calculates at least one of cylinder mass air flow, torque and an air/fuel ratio based on the VE estimate. For example only, the control module 40 may use the estimated VE to calculate MAF, the A/F ratio and/or torque. The control module 40 adjusts fuel, spark, and/or other engine operating values to adjust the operation of the engine system 10.

Figure 2A:
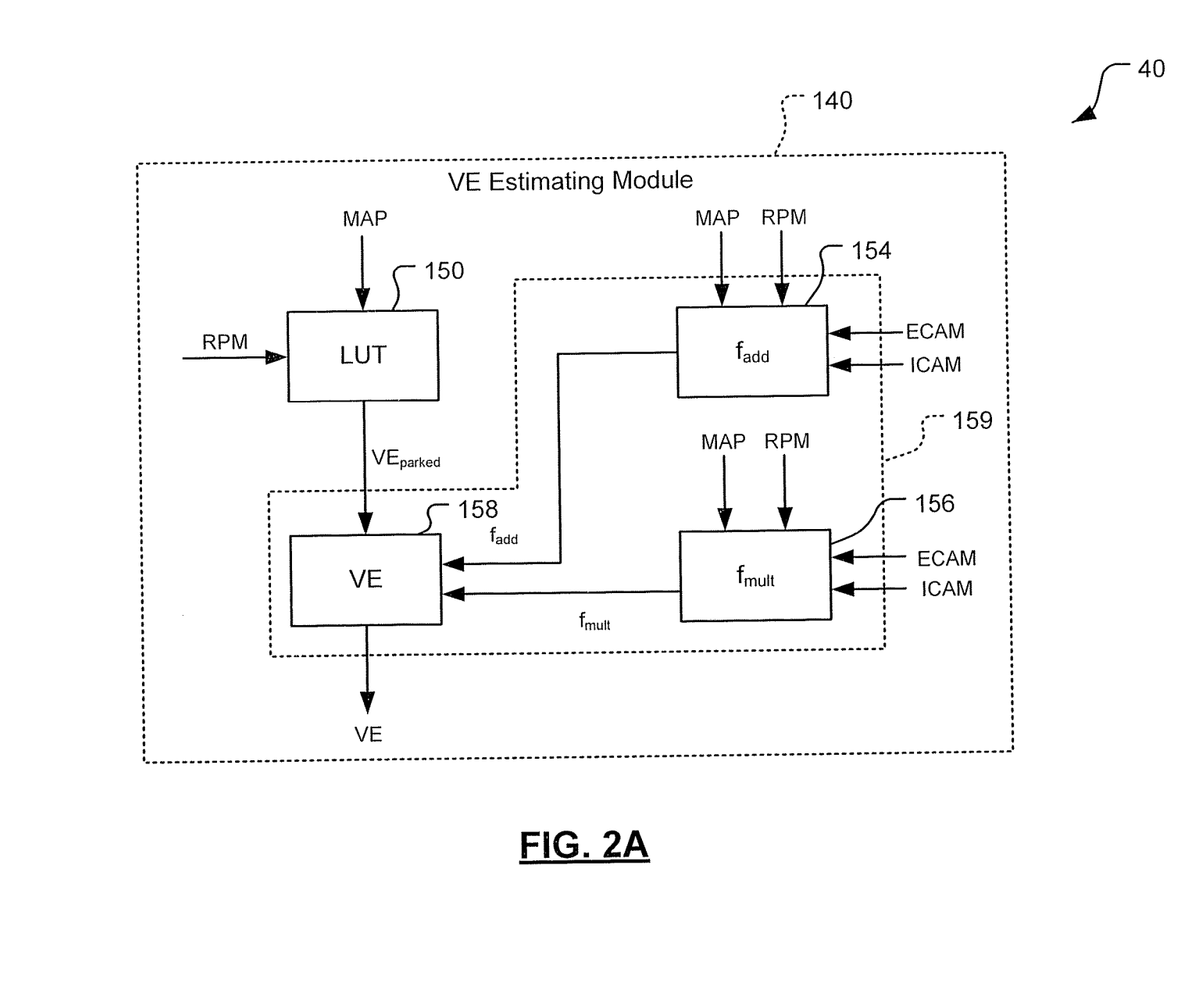
FIG. 2A illustrates an exemplary control module comprising a VE estimation module.

Referring now to FIG. 2A, the control module 40 may comprise a VE estimation module 140. The VE estimation module 140 may comprise a lookup table 150 that performs a lookup of $VE_{parked}$. An addition factor calculating module 154 calculates $f_{add}$ based on various input parameters. For example only, the input parameters may include MAP, RPM, ICAM and ECAM. A multiplication factor module 156 calculates $f_{mult}$ based on various input parameters. For example only, the input parameters may include MAP, RPM, ICAM and ECAM. A VE calculating module 158 calculates VE based on $VE_{parked}$, $f_{add}$ and $f_{mult}$. The VE calculating module 158, the multiplication factor module 156 and the addition factor module 154 may be collectively referred to as the calculating module 159.

Figure 2B:
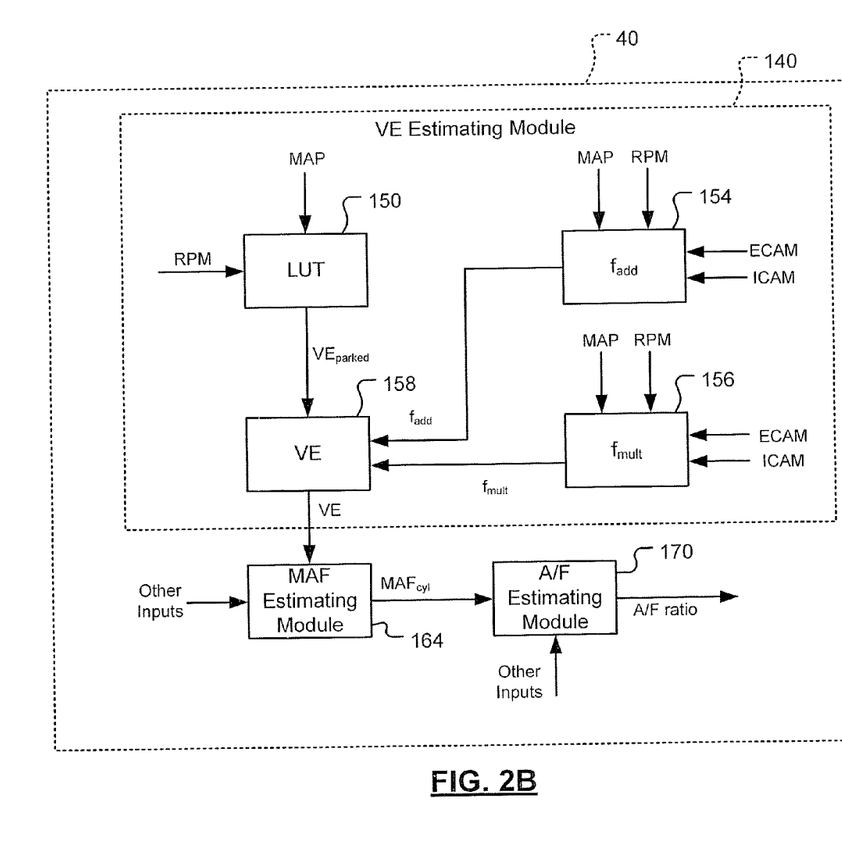
FIG. 2B illustrates an exemplary control module comprising a VE estimation module, a cylinder MAF estimation module and an A/F estimation module.

Referring now to FIG. 2B, the control module 40 may use the VE output by the VE estimation module 140 as an input to a cylinder MAF estimation module 164, which calculates $MAF_{cyl}$ based thereon and one or more other parameters. An air/fuel (A/F) estimation module 170 receives the $MAF_{cyl}$ and one or more other input parameters and calculates A/F ratio based thereon.

Referring now to FIGS. 3-7, the VE maps have a response that is predominantly determined by the response when the cams are in the parked position. However, differences between the VE maps at non-parked cam positions and parked positions are non-trivial.

Figure 3:
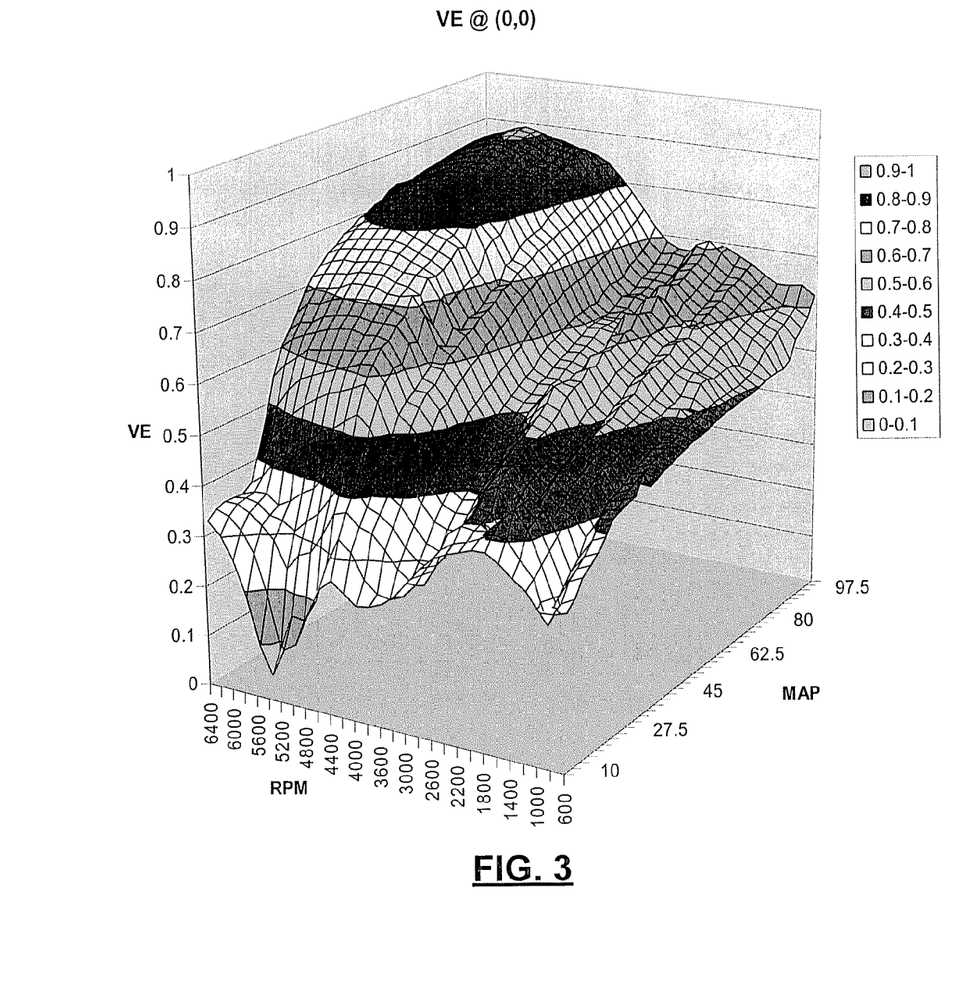
FIG. 3 is a graph of an exemplary VE function with intake and exhaust cams in parked positions.
Figure 4:
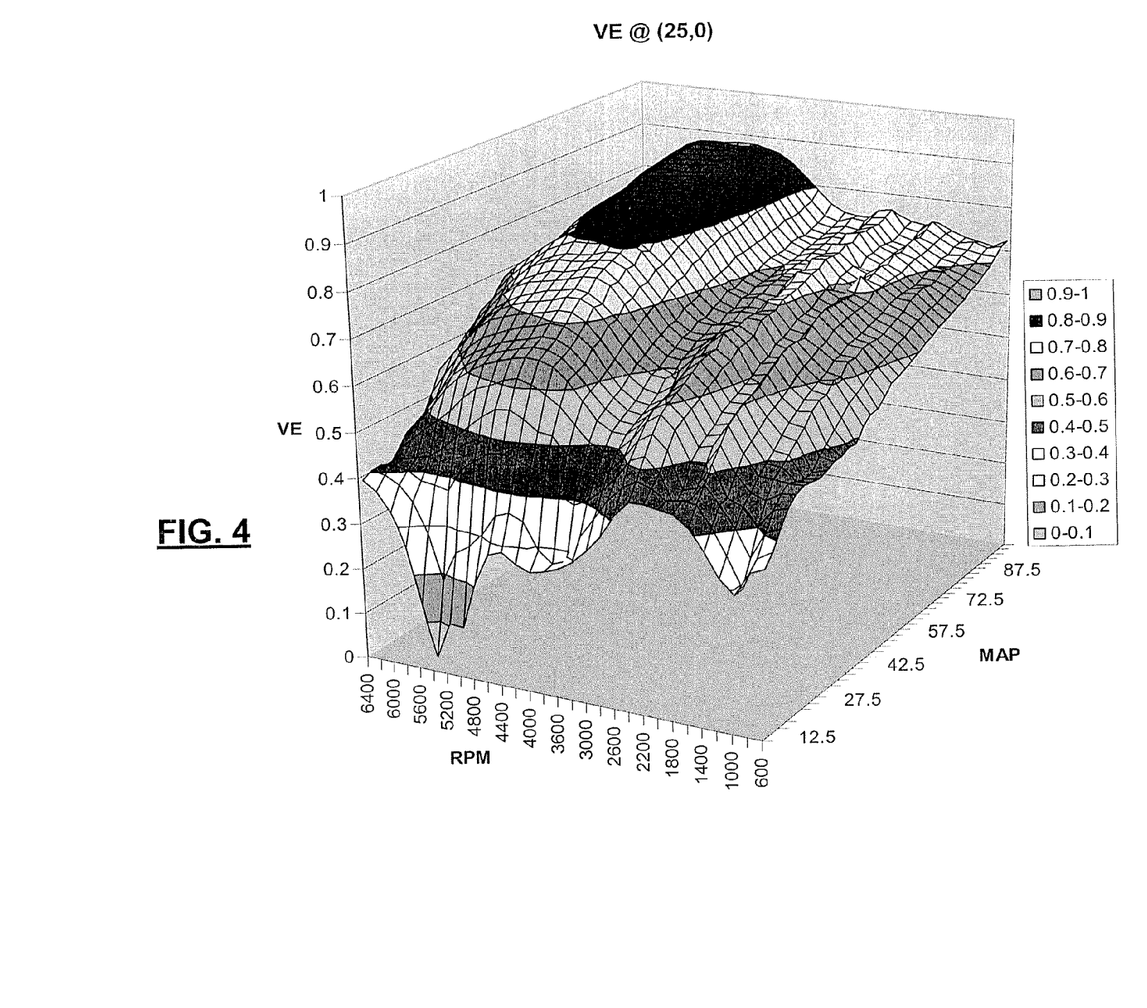
FIG. 4 is a graph of an exemplary VE function when the intake cam is fully advanced and the exhaust cam is in its parked position.
Figure 5:
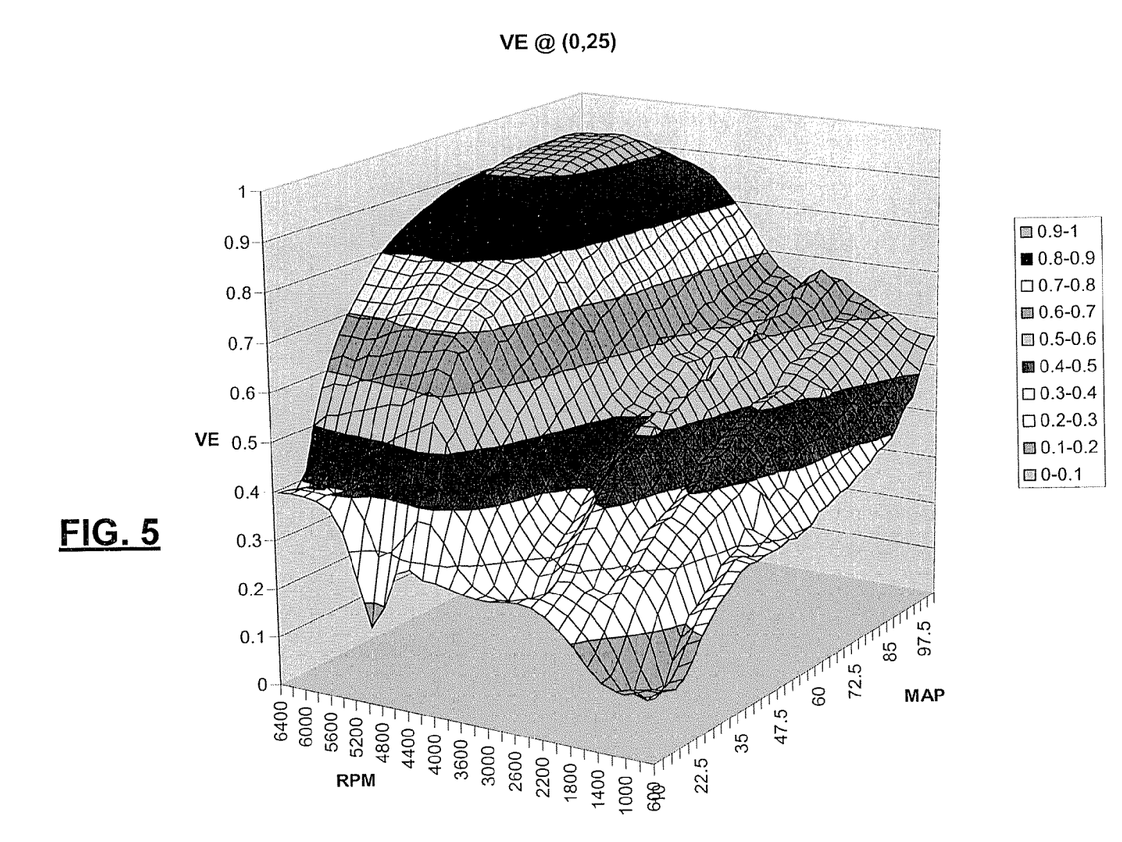
FIG. 5 is a graph of an exemplary VE function when the intake cam is parked and the exhaust cam is fully retarded.

In FIG. 3, an exemplary VE functional is shown for an internal combustion engine when both cams are in the parked positions. In FIG. 4, an exemplary VE function is shown for an internal combustion engine when the intake cam is fully advanced and the exhaust cam is in a parked position. In FIG. 5, an exemplary VE function is shown for an internal combustion engine when the intake cam is parked and the exhaust cam is fully retarded.

Figure 6:
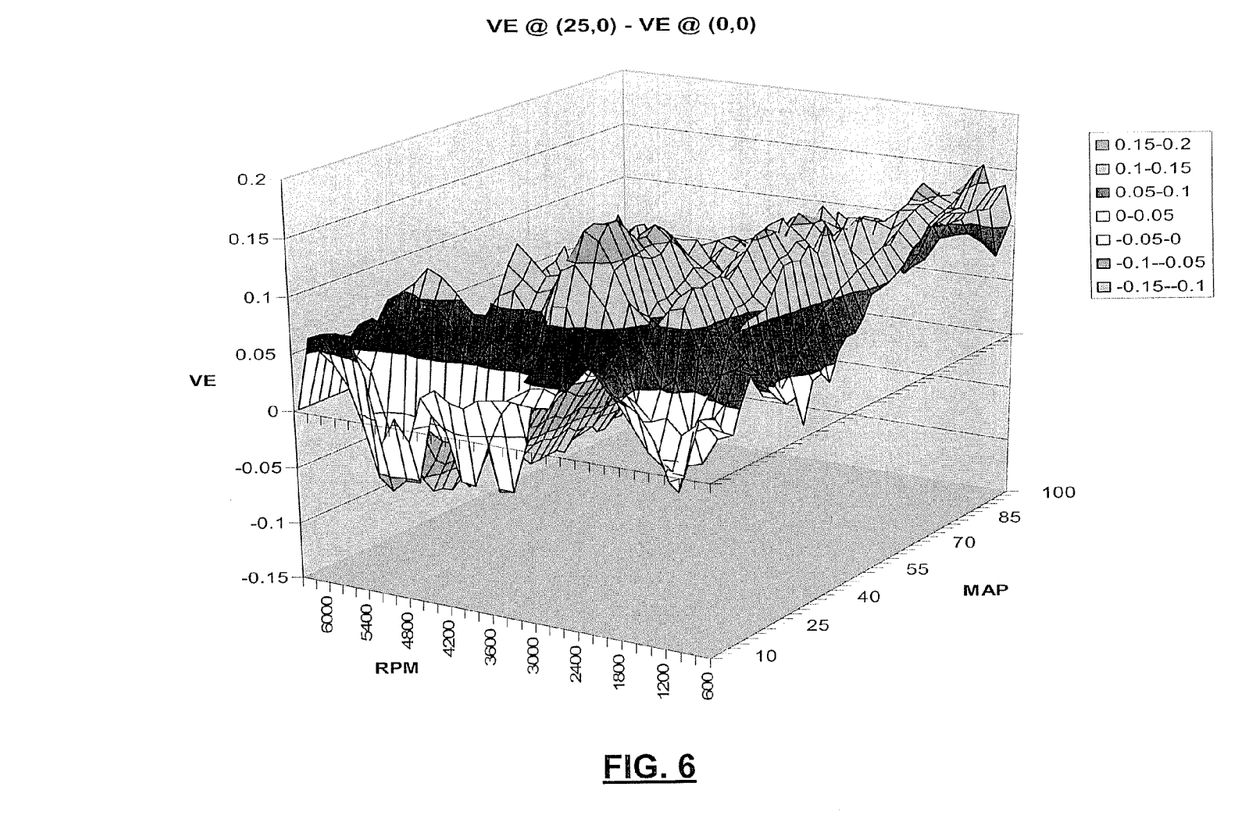
FIG. 6 is a graph of an exemplary difference between a typical VE function when the intake cam is fully advanced and the exhaust cam is parked and a typical VE function when both cams are parked.
Figure 7:
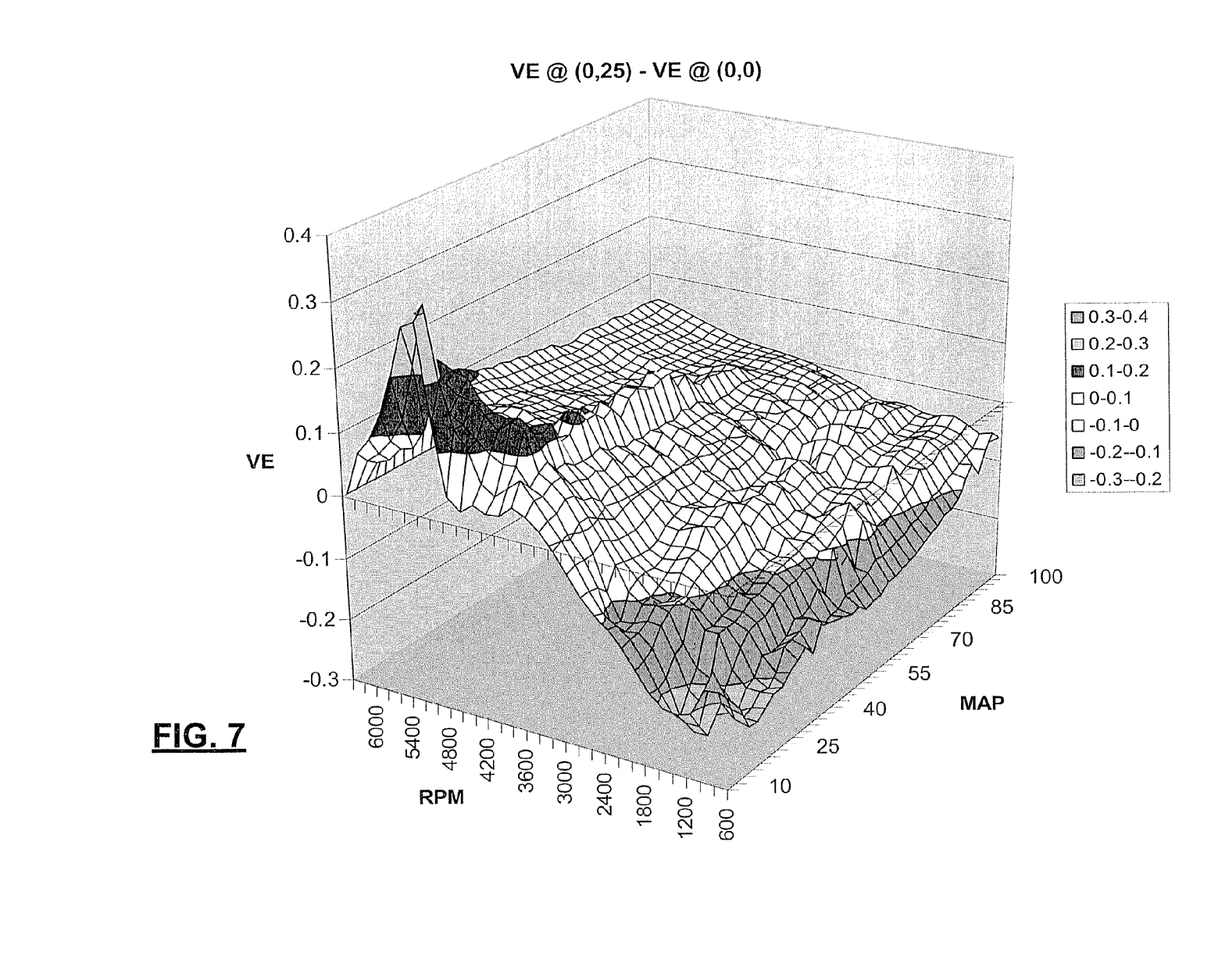
FIG. 7 is a graph of an exemplary difference between a typical VE function when the exhaust cam is fully retarded and the intake cam is parked and a VE function when both cams are parked.

In FIG. 6, a difference is shown between a typical VE function when the intake cam is fully advanced and the exhaust cam is parked and a typical VE function when both cams are parked. In FIG. 7, a difference is shown between a typical VE function when the exhaust cam is fully retarded and the intake cam is parked and a VE function when both cams are parked.

Figure 8:
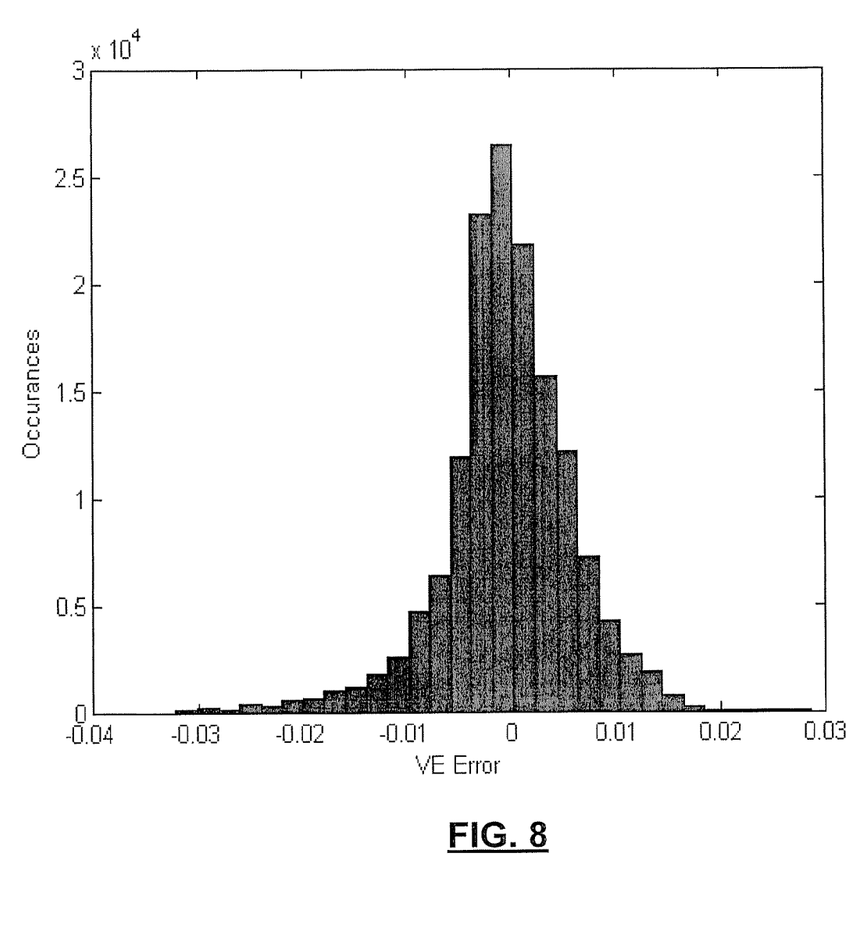
FIG. 8 is a histogram of errors between actual VE values and estimated VE according to the present disclosure.

In FIG. 8, a histogram of errors between actual and modeled VE values is shown. Coefficients for the model may be selected to minimize the difference between actual and modeled VE.

Exemplary advantages of the systems and methods according to the present disclosure include increased accuracy over current VE representations and less calibration effort. The approach also reduces storage and/or processing power requirements. The present disclosure can be readily implemented in the control module.

What is claimed is:

1. An engine control module comprising:
    a table that generates a parked VE estimate based on engine speed and load when intake and exhaust cam phasers of an engine are in a parked position; and
    a calculation module that calculates a VE estimate using a mathematical relationship based on said parked VE estimate and said engine speed and load when said intake and exhaust cam phasers are not in a parked position.

2. The engine control module of claim 1 wherein said calculation module comprises:
    an addition module that generates an addition term based on a first mathematical relationship.

3. The engine control module of claim 2 wherein said first mathematical relationship is based on manifold absolute pressure (MAP), engine speed (RPM), an intake cam phaser (ICAM) position and an exhaust cam phaser (ECAM) position.

4. The engine control module of claim 3 wherein said first mathematical relationship is:

$$f_{add}(ICAM,ECAM,MAP,RPM)=b_1 ICAM+b_2 ECAM+ b_3 ICAM*ECAM+b_4 ICAM^2+b_5 ECAM^2+ b_6 ICAM*MAP+b_7 ECAM*MAP+ b_8 RPM*ICAM+b_9 RPM*ECAM+ b_{10} RPM*MAP*ICAM*ECAM$$

where $b_{1 \ldots 10}$ are calibration coefficients.

5. The engine control module of claim 2 wherein said calculation module comprises:
a multiplication module that generates a multiplication term based on a second mathematical relationship.

6. The engine control module of claim 5 wherein said second mathematical relationship is based on manifold absolute pressure (MAP), engine speed (RPM), an intake cam phaser position (ICAM) and an exhaust cam phaser position (ECAM).

7. The engine control module of claim 6 wherein said second mathematical relationship is:

$$f_{mult}(ICAM,ECAM,MAP,RPM)=1+a_1 ICAM+ a_2 ECAM+a_3 ICAM*ECAM+a_4 ICAM^2+ a_5 ECAM^2+a_6 ICAM*MAP+a_7 ECAM*MAP+ a_8 MAP^2*ICAM*ECAM+ a_9 RPM*ICAM*ECAM+ a_{10} RPM^2*ICAM*ECAM$$

where $a_{1 \ldots 10}$ are calibration coefficients.

8. The engine control module of claim 5 wherein said calculation module comprises:
a VE calculation module that calculates said VE estimate using a third mathematical relationship based on said parked VE estimate, said addition term and said multiplication term.

9. The engine control module of claim 8 wherein said third mathematical relationship is:

$$VE=VE_{parked} \times f_{mult}+f_{add}$$

wherein said addition term is $f_{add}$ and said multiplication term is $f_{mult}$.

10. The engine control module of claim 1 wherein said engine control module calculates at least one of cylinder mass air flow, torque and an air/fuel ratio based on said VE estimate.

11. A method comprising:
providing a table that outputs a parked VE estimate based on engine speed and load when intake and exhaust cam phasers of an engine are in a parked position; and
calculating a VE estimate using a mathematical relationship based on said parked VE estimate and said engine speed and load when said intake and exhaust cam phasers are not in a parked position.

12. The method of claim 11 wherein said calculating comprises generating an addition term based on a first mathematical relationship.

13. The method of claim 12 wherein said first mathematical relationship is based on manifold absolute pressure (MAP), engine speed (RPM), an intake cam phaser position (ICAM) and an exhaust cam phaser position (ECAM).

14. The method of claim 13 wherein said first mathematical relationship is:

$$f_{add}(ICAM,ECAM,MAP,RPM)=b_1 ICAM+b_2 ECAM+ b_3 ICAM*ECAM+b_4 ICAM^2+b_5 ECAM^2+ b_6 ICAM*MAP+b_7 ECAM*MAP+ b_8 RPM*ICAM+b_9 RPM*ECAM+ b_{10} RPM*MAP*ICAM*ECAM$$

where $b_{1 \ldots 10}$ are calibration coefficients.

15. The method of claim 12 wherein said calculating comprises generating a multiplication term based on a second mathematical relationship.

16. The method of claim 15 wherein said second mathematical relationship is based on manifold absolute pressure (MAP), engine speed (RPM), an intake cam phaser position (ICAM) and an exhaust cam phaser position (ECAM).

17. The method of claim 16 wherein said second mathematical relationship is:

$$f_{mult}(ICAM,ECAM,MAP,RPM)=1+a_1 ICAM+ a_2 ECAM+a_3 ICAM*ECAM+a_4 ICAM^2+ a_5 ECAM^2+a_6 ICAM*MAP+a_7 ECAM*MAP+ a_8 MAP^2*ICAM*ECAM+ a_9 RPM*ICAM*ECAM+ a_{10} RPM^2*ICAM*ECAM$$

where $a_{1 \ldots 10}$ are calibration coefficients.

18. The method of claim 15 wherein said calculating comprises calculating said VE estimate using a third mathematical relationship based on said parked VE estimate, said addition term and said multiplication term.

19. The method of claim 18 wherein said third mathematical relationship is:

$$VE=VE_{parked} \times f_{mult}+f_{add}$$

wherein said addition term is $f_{add}$ and said multiplication term is $f_{mult}$.

20. The method of claim 11 further comprising calculating at least one of cylinder mass air flow, torque and an air/fuel ratio based on said VE estimate.

* * * * *